US011628329B2

(12) United States Patent
Heisner

(10) Patent No.: US 11,628,329 B2
(45) Date of Patent: Apr. 18, 2023

(54) SIMULATED BICYCLE BRAKE HOOD ATTACHMENT

(71) Applicant: HIZE, LLC, Melrose, MA (US)

(72) Inventor: Craig Heisner, Melrose, MA (US)

(73) Assignee: HIZE, LLC, Melrose, MA (US)

( * ) Notice: Subject to any disclaimer, the term of this patent is extended or adjusted under 35 U.S.C. 154(b) by 441 days.

(21) Appl. No.: 16/941,656

(22) Filed: Jul. 29, 2020

(65) Prior Publication Data

US 2021/0031068 A1 Feb. 4, 2021

Related U.S. Application Data

(60) Provisional application No. 62/879,932, filed on Jul. 29, 2019.

(51) Int. Cl.
*A63B 22/06* (2006.01)
*A63B 21/00* (2006.01)
*B62K 21/12* (2006.01)
*A63B 71/06* (2006.01)

(52) U.S. Cl.
CPC ...... *A63B 21/4035* (2015.10); *A63B 22/0605* (2013.01); *B62K 21/12* (2013.01); *A63B 2071/0655* (2013.01); *A63B 2071/0658* (2013.01)

(58) Field of Classification Search
CPC .............. A63B 21/4035; A63B 22/06; A63B 22/0605; A63B 71/0622; A63B 2071/0655; A63B 2071/0658; A63B 2209/00; A63B 2209/10; B62K 21/12; B62K 21/125
See application file for complete search history.

(56) References Cited

U.S. PATENT DOCUMENTS

| | | | |
|---|---|---|---|
| 5,163,339 A | 11/1992 | Giard, Jr. et al. | |
| 5,201,243 A | 4/1993 | Schneider | |
| 5,224,396 A | 7/1993 | Lobbezoo et al. | |
| 5,265,496 A | 11/1993 | Townsend | |
| 5,319,995 A | 6/1994 | Huang | |
| 5,660,085 A | 8/1997 | Tamplin | |
| 9,352,183 B2 | 5/2016 | Quinn | |
| 10,004,940 B2 * | 6/2018 | Badarneh | A63B 21/0051 |
| 11,155,319 B2 * | 10/2021 | Luman | B62K 23/06 |
| 11,400,995 B2 * | 8/2022 | Tuulari | B62J 45/41 |
| 2010/0186545 A1 | 7/2010 | Ray | |
| 2010/0206124 A1 | 8/2010 | Ferrusi | |
| 2015/0197306 A1 | 7/2015 | Denby | |
| 2015/0290490 A1 * | 10/2015 | Badarneh | A63B 21/00076 482/57 |
| 2016/0311496 A1 | 10/2016 | Atterbury | |
| 2020/0001132 A1 * | 1/2020 | Tuulari | B62J 45/41 |
| 2020/0407011 A1 * | 12/2020 | Luman | B62L 3/023 |

* cited by examiner

*Primary Examiner* — Joshua Lee
(74) *Attorney, Agent, or Firm* — Grossman Tucker Perreault & Pfleger, PLLC

(57) ABSTRACT

A simulated bicycle brake hood attachment may be attached to handlebars of a stationary bicycle, such as Echelon, Bowflex, Keiser, Schwinn or PELETON® indoor stationary bicycles, and allow the user to mimic real road bike riding positions. The simulated bicycle brake hood attachment includes a base portion for attaching to the handlebars, a post portion extending from the base portion and a head portion a top of the post portion. The post portion and the head portion provide rounded surfaces to allow a comfortable grip and provide a more ergonomic riding position and improve riding comfort.

18 Claims, 9 Drawing Sheets

SIMULATED BICYCLE BRAKE HOOD ATTACHMENT

RELATED APPLICATIONS

The present application claims the benefit of U.S. Provisional Patent Application Ser. No. 62/879,932 filed Jul. 29, 2019, which is fully incorporated herein by reference.

TECHNICAL FIELD

The present disclosure relates to exercise equipment and more particularly, to a simulated bicycle brake hood attachment for use with a stationary bicycle.

BACKGROUND INFORMATION

Stationary bicycles, produced by numerous brands including Echelon, Bowflex, Schwinn, Keiser, and Peloton® indoor stationary bicycles, are designed to provide a cycling workout. Because these stationary bicycles are used indoors, however, they do not include certain features required for outdoor road bikes, such as braking systems. On a road bike, a brake lever and hood system is located the handlebars and is often where a cyclist rests his or her hands during cycling. This is referred to as "riding on the hoods" and is arguably the most efficient and comfortable riding position. Because such braking systems are unnecessary on stationary bicycles, the handlebars of the stationary bicycles do not accurately mimic real road bike rider positions and limit the riding positions and comfort of the cyclist.

The hand contact point on a bike impacts overall ride posture and contributes to injury prevention and sustained output over longer periods of riding time. The contact point of the hand properly aligns the hand and forearm to help avoid ulnar neuropathy (cycle palsy) and contribute to more relaxed elbows, shoulders and lower back.

BRIEF DESCRIPTION OF THE DRAWINGS

These and other features and advantages will be better understood by reading the following detailed description, taken together with the drawings wherein.

DETAILED DESCRIPTION

A simulated bicycle brake hood attachment, consistent with embodiments of the present disclosure, may be attached to handlebars of a stationary bicycle, such as Echelon, Bowflex, Keiser, Schwinn or PELETON® indoor stationary bicycles, and allow the user to mimic real road bike riding positions. The simulated bicycle brake hood attachment includes a base portion for attaching to the handlebars, a post portion extending from the base portion and a head portion at the other end of the post portion. The post portion and the head portion provide rounded surfaces to allow a comfortable grip, provide a more ergonomic riding position and improve riding comfort.

Figure 1A:
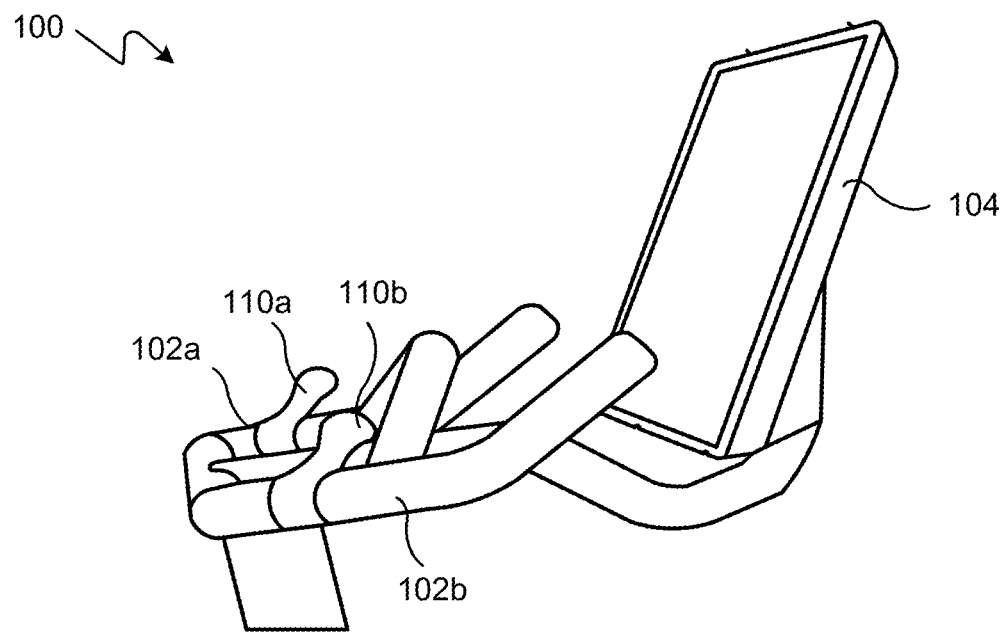
FIG. 1A is a side view of handlebars of a stationary bicycle with simulated bicycle brake hood attachments, consistent with embodiments of the present disclosure.
Figure 1B:
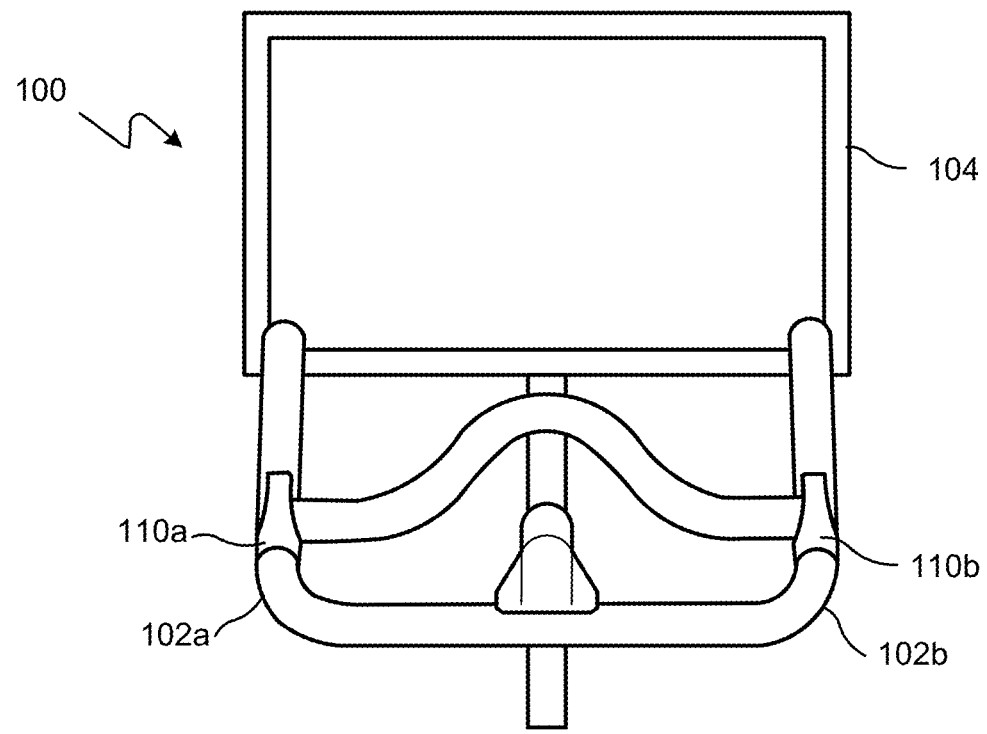
FIG. 1B is a front view of the handlebars of a stationary bicycle with the simulated bicycle brake hood attachments shown in FIG. 1A.
Figure 2:
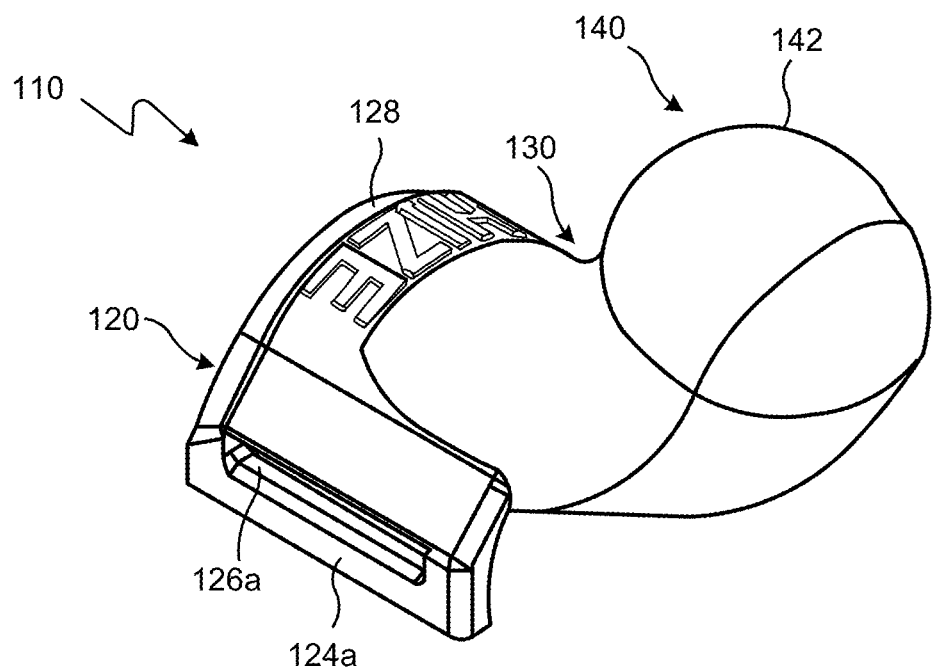
FIG. 2 is a top perspective view of an embodiment of a simulated bicycle brake hood attachment.
Figure 3:
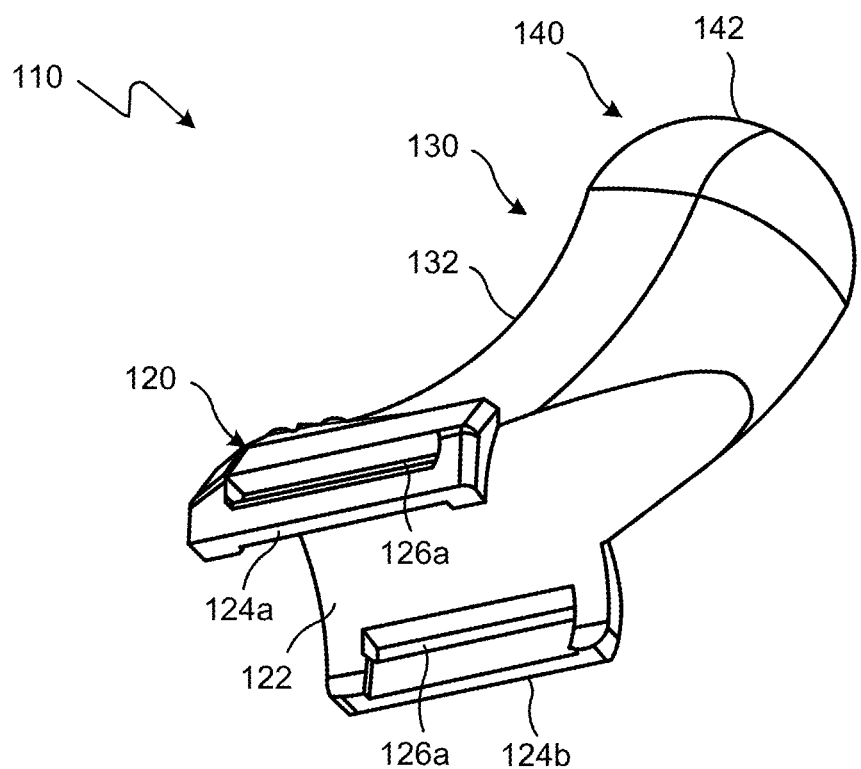
FIG. 3 is a bottom perspective view of an embodiment of a simulated bicycle brake hood attachment.

Referring to FIGS. 1A and 1B, simulated bicycle brake hood attachments 110a, 110b may be attached or mounted to left and right handlebars 102a, 102b of a stationary bicycle 100. The illustrated embodiment shows a PELETON® indoor stationary bicycle 100 with a display 104, but the simulated bicycle brake hood attachments 110a, 110b may be mounted on other types of stationary bicycles. The simulated bicycle brake hood attachments 110a, 110b may be mounted in different positions and with different orientations on the fixed handlebars 102a, 102b to allow different options for user hand placements.

Referring to FIGS. 2-10, an embodiment of a simulated bicycle brake hood attachment 110 is shown and described in greater detail. The simulated bicycle brake hood attachment 110 generally includes a base portion 120, a post portion 130 extending at one end from the base portion 120, and a head portion 140 at the other end of the post portion 130. The base portion 120 is configured to be attached to the fixed handlebar of the stationary bike and the post portion 130 is configured to be gripped by the user. The base portion 120, the post portion 130 and the head portion 140 may extend a length l in a range of 60-80 mm in a direction of the handlebar and preferably about 70 mm.

The base portion 120 includes a partially cylindrical mounting region 122 on an underside of the base portion 120, which is shaped to receive and conform to a cylindrical handlebar having a diameter in a range of 30-40 mm. The base portion 120 may have a width $w_b$ in a range of 34-48 mm and preferably about 42 mm. The base portion 120 also includes attachment ends 124a, 124b on each side of the partially cylindrical mounting region 122 of the base portion 120. The attachment ends 124a, 124b may define openings 126a, 126b configured to receive an attachment mechanism (not shown), as will be described in greater detail below. The top section 128 of the base portion 126 may extend with a length $l_b$ in a range of 10-16 mm and preferably about 14 mm. The top section 128 of the base portion 126 is designed to allow a smooth transition from the handlebar to the post portion 130 and the length $l_b$ may be minimized to allow the hand to extend onto the fixed handlebar as much as possible for additional support. The attachment ends 124a, 124b are designed to provide a secure attachment to the handlebar and may have a length $l_a$ in a range of 32-40 mm and preferably about 36 mm.

Figure 4:
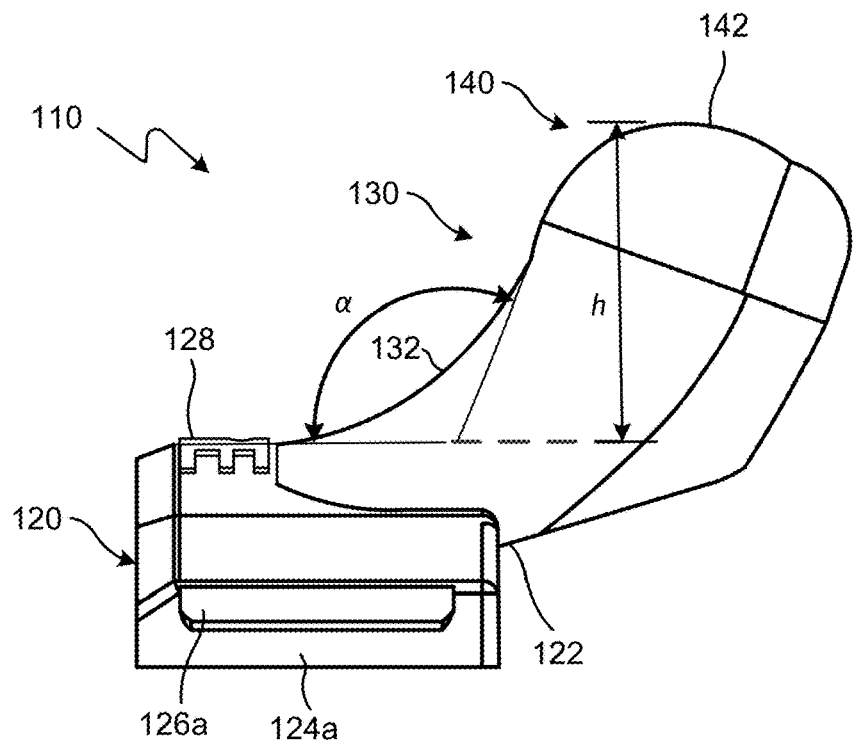
FIG. 4 is a first side view of the simulated bicycle brake hood attachment shown in FIG. 3.
Figure 5:
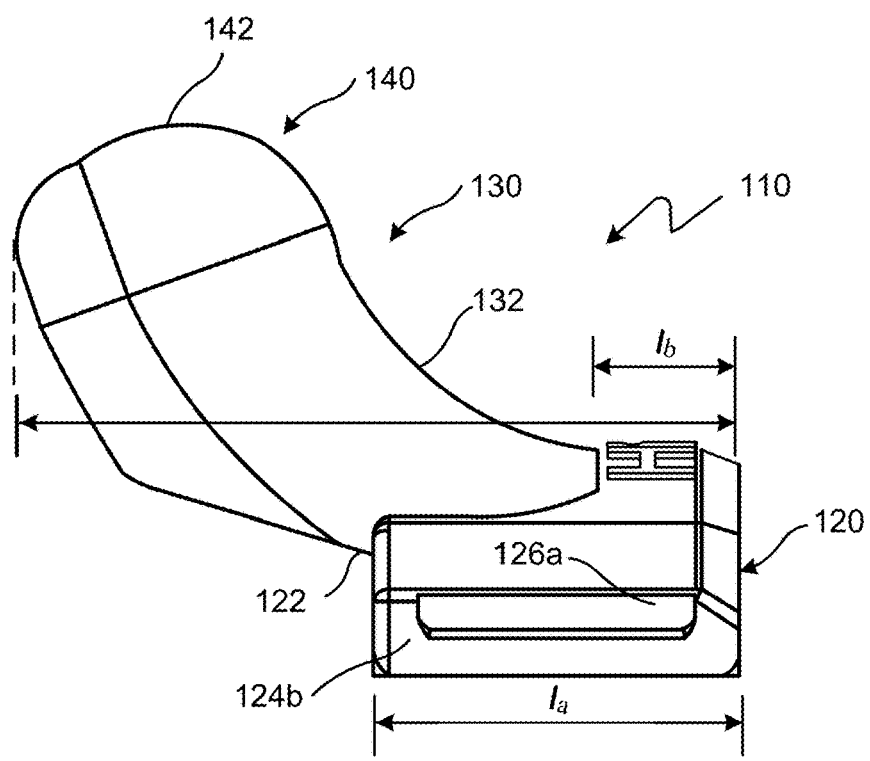
FIG. 5 is a second side view of the simulated bicycle brake hood attachment shown in FIG. 3.
Figure 6:
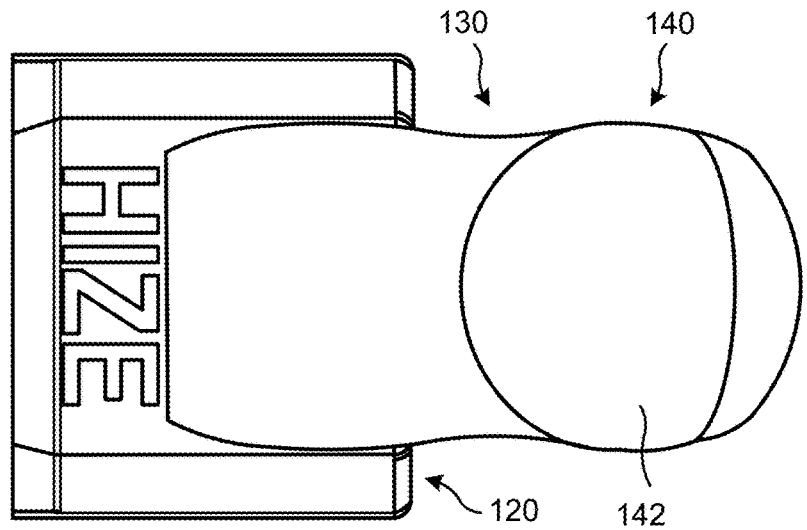
FIG. 6 is a top view of the simulated bicycle brake hood attachment shown in FIG. 3.
Figure 7:
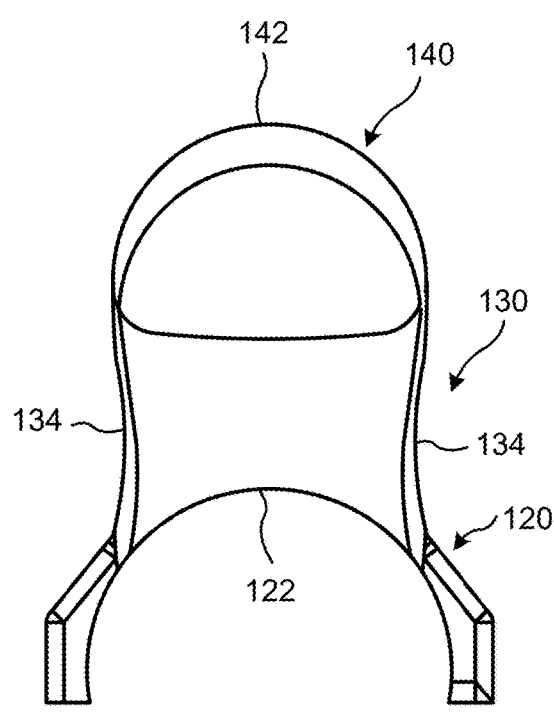
FIG. 7 is a front view of the simulated bicycle brake hood attachment shown in FIG. 3.
Figure 8:
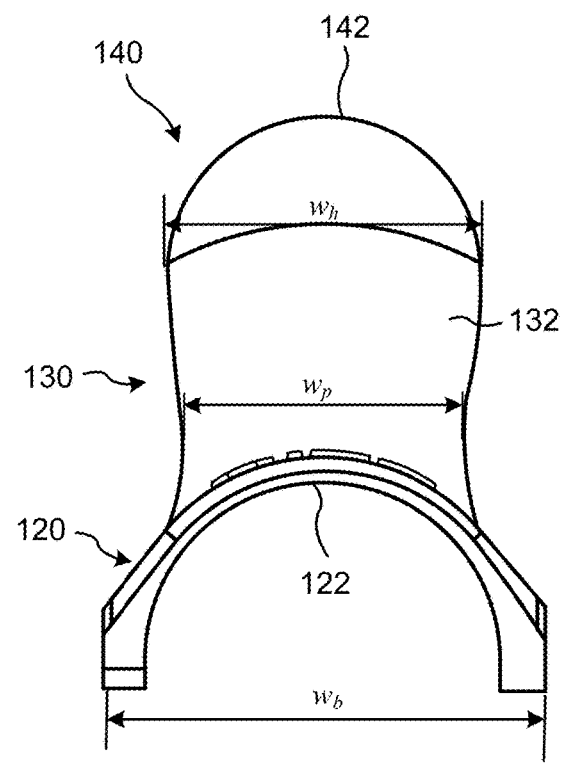
FIG. 8 is a back view of the simulated bicycle brake hood attachment shown in FIG. 3.
Figure 9:
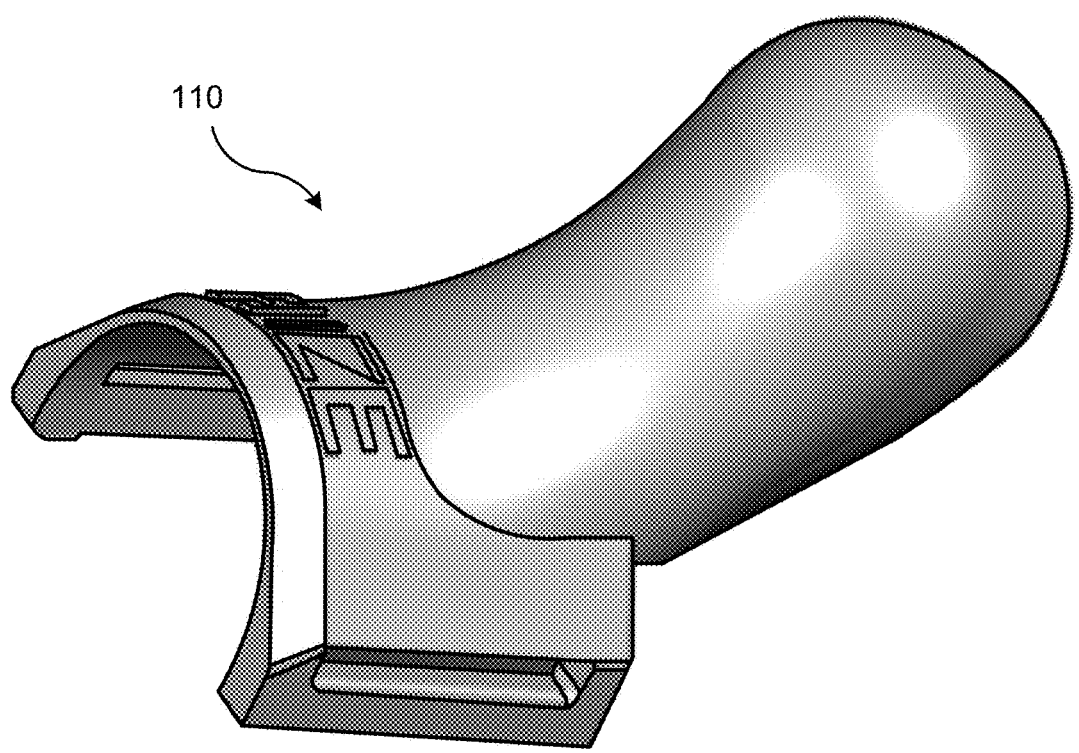
FIG. 9 is a top perspective view of the simulated bicycle brake hood attachment shown in FIG. 3.

The post portion 130 extends from the base portion 120 and includes a rounded surface 132 on at least a front side, which is configured to be received between a thumb and forefinger of a user and comfortably fit against the web of the user's hand. The post portion 130 extends from the base portion 120 at an obtuse angle α in a range of 110-130 degrees and preferably about 120 degrees. The rounded surface 132 may also be curved upwards from the top section 128 of the base portion 126, for example, as shown in FIGS. 4 and 5, to provide a smooth transition to the post portion 130. The post portion 130 may have a width $w_p$ in a range of 23-33 mm and preferably about 28 mm and a height h in a range of 18-26 mm and preferably about 22 mm.

The head portion 140 is located at the top of the post portion 130 and includes a rounded top surface 142. The head portion 140 has a width $w_h$ in a range of 25-35 mm and preferably about 30 mm. The width $w_h$ of the head portion 140 may be greater than the width $w_p$ of the post portion 130 to define curved regions 134 on an outside of the post portion 130, which facilitate gripping the post portion 130.

Figure 10:
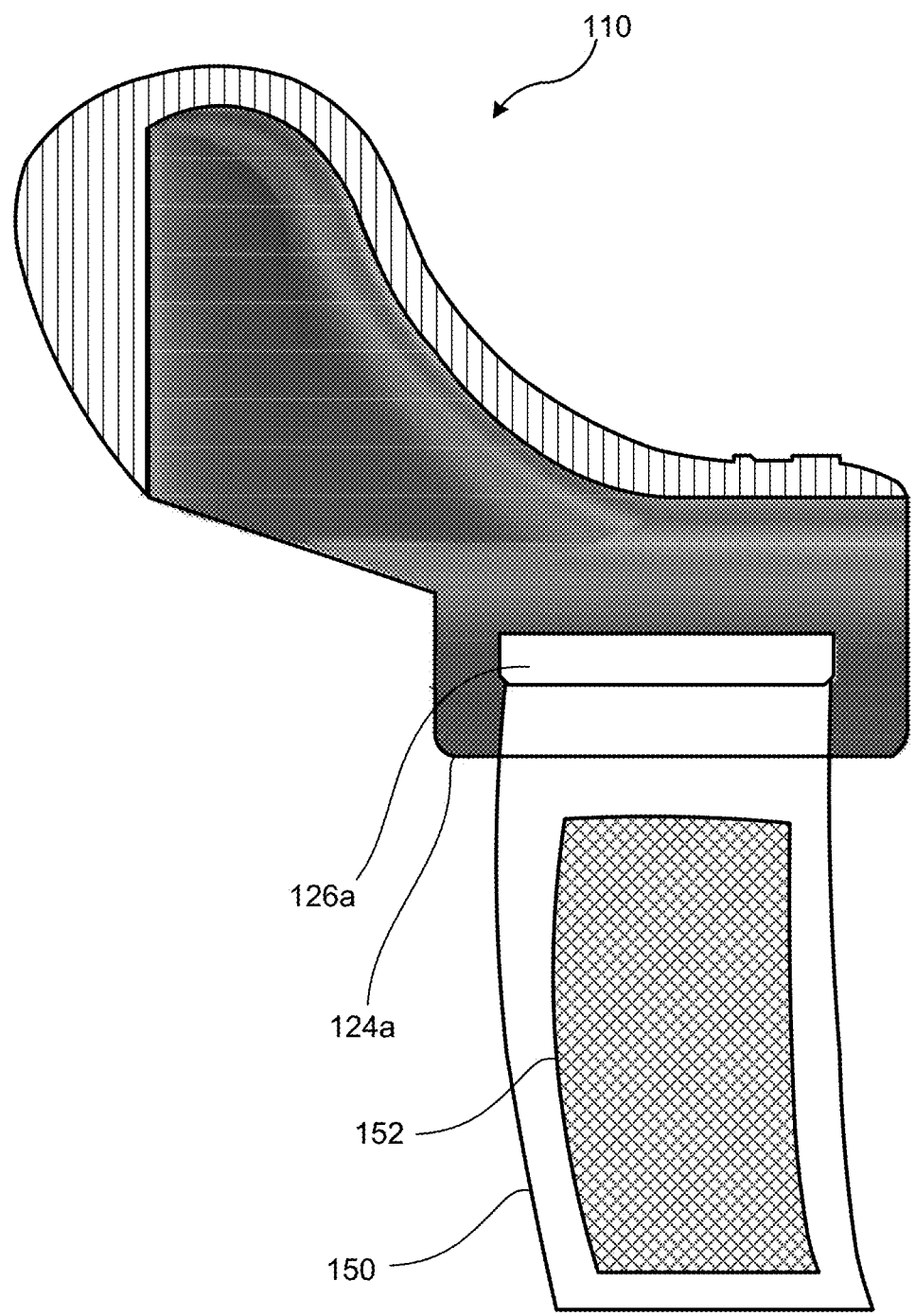
FIG. 10 is a cross-sectional view of the simulated bicycle brake hood attachment shown in FIG. 3 with a strap for attachment.
Figure 11:
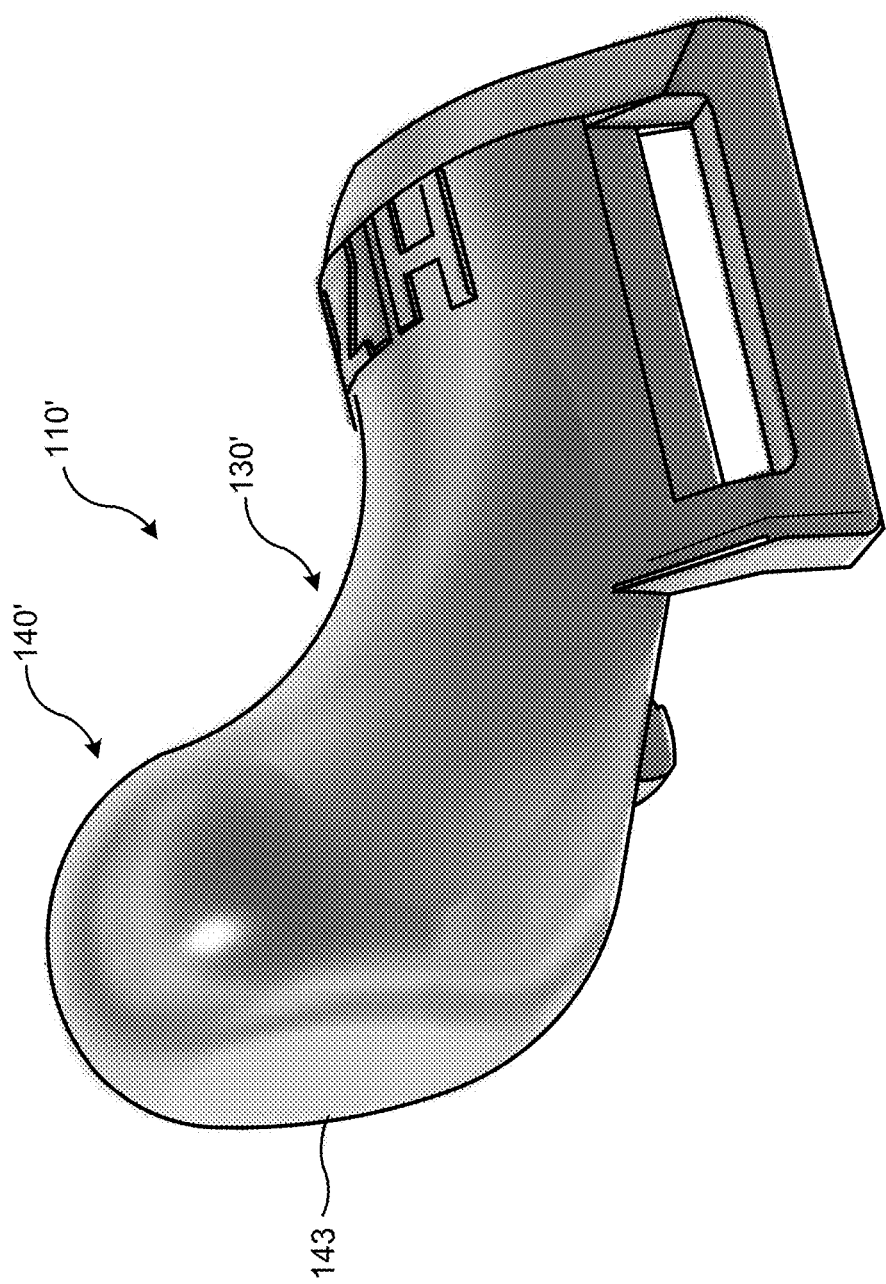
FIG. 11 is a perspective view of another embodiment of a simulated bicycle brake hood attachment.
Figure 13:
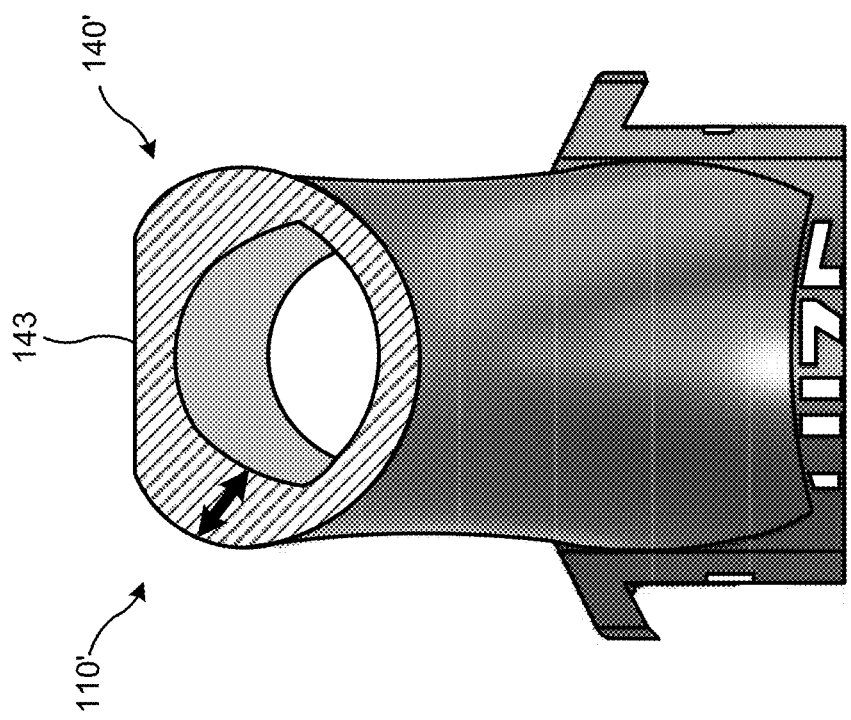
FIG. 13 is top cross-sectional view of the simulated bicycle brake hood attachment shown in FIG. 11.
Figure 12:
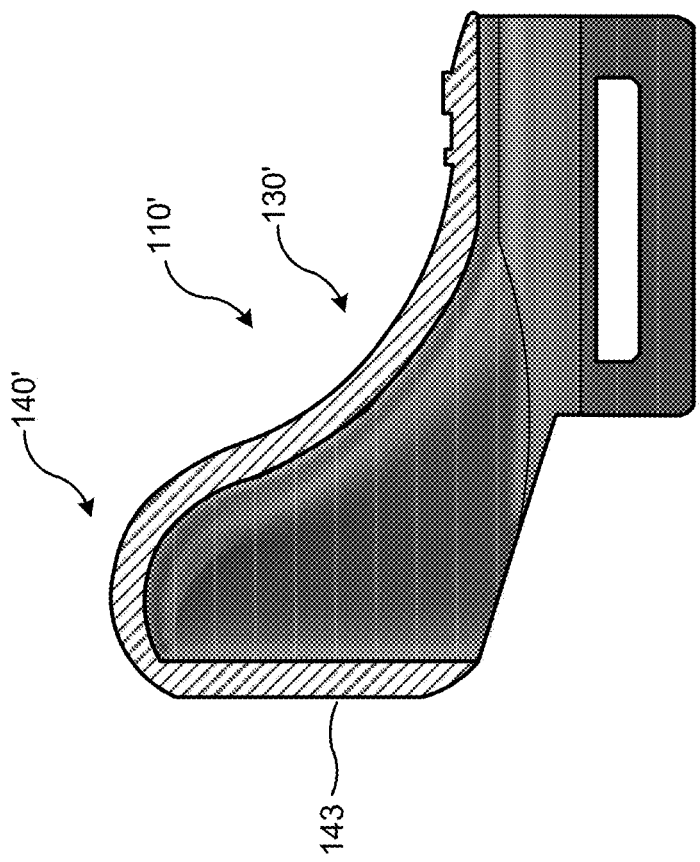
FIG. 12 is a side cross-sectional view of the simulated bicycle brake hood attachment shown in FIG. 11.
Figure 14E:
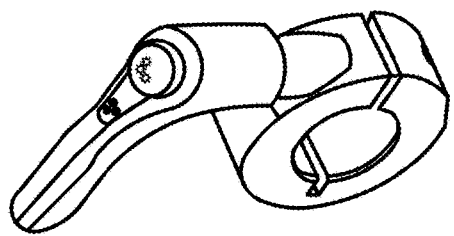
FIGS. 14A-14E are perspective views of attachment mechanisms that may be used with the simulated bicycle brake hood attachment, consistent with embodiments of the present disclosure.
Figure 14B:
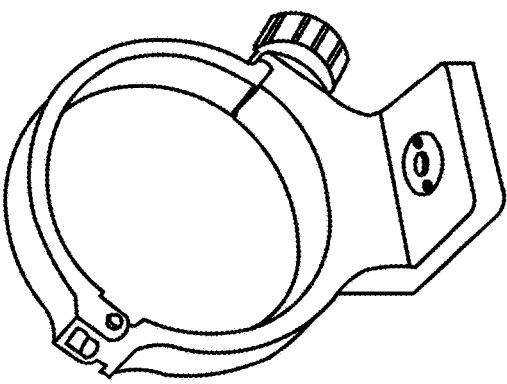
Figure 14D:
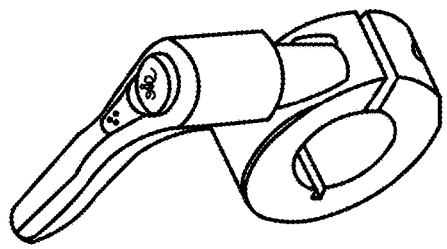
Figure 14A:
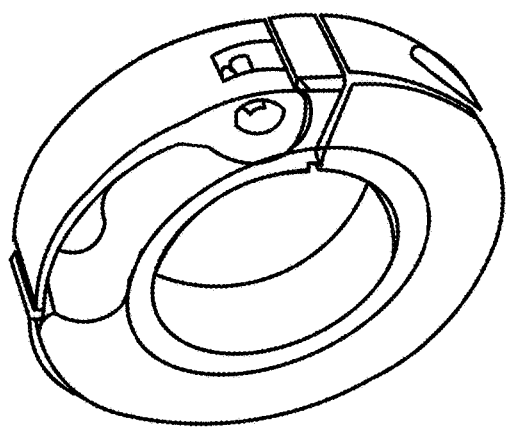
Figure 14C:
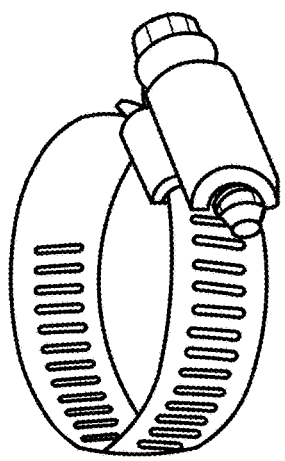

The simulated bicycle brake hood attachment 110 may be molded from a thermoplastic or similar material and may have a hollow or cored construction, as shown in FIG. 10, to facilitate molding. Referring to FIGS. 11-13, another embodiment of the simulated bicycle brake hood attachment 110' may have a substantially flat surface 143 on a back side (i.e., opposite the side engaged by the hands) of the head portion 140'. The flat surface 143 reduces the wall thickness on the back side of the head portion 140' and/or post portion 130' to facilitate injection molding.

As shown in FIG. 10, the attachment mechanism may include a self-engaging strap 150 with a hook and loop fastener 152, such as the OMNI-TAPE® Brand Hook & Loop Fasteners or the VELCRO® Brand self-engaging hook and loop straps or double-sided hook and loop straps. The self-engaging strap 152 may be sized to fit within the openings 126a, 126b in the attachment ends 124a, 124b and securely around the handlebar of the stationary bicycle. In one example, the self-engaging strap may have a width of about 1 in. and a length of about 6 in.

Other attachment mechanisms may be based on various known mechanisms, such as the clamping mechanisms shown in FIGS. 14A-14E, which are capable of providing a sturdy connection on the stationary bicycle handlebars.

Accordingly, the simulated bicycle brake hood attachment, consistent with embodiments disclosed herein, may be attached to fixed handlebars of a stationary bicycle to simulate a brake lever system and provide an additional hand position that is more similar to an actual road bike and more ergonomic.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A simulated bicycle brake hood attachment comprising:
   a base portion defining a partially cylindrical mounting region configured to receive a portion of a handlebar of a stationary bicycle, wherein the base portion includes attachment ends on each side of the base portion;
   a post portion extending at a first end from the base portion, the post portion including a rounded surface configured to receive a web of a hand between a thumb and forefinger;
   a head portion at a second end of the post portion, the head portion including a rounded top surface; and
   an attachment mechanism coupled to the attachment ends and configured to be secured around the handlebar, wherein the attachment mechanism includes a self-engaging strap.

2. The simulated bicycle brake hood attachment of claim 1 wherein the self-engaging strap includes a hook and loop fastener.

3. The simulated bicycle brake hood attachment of claim 1 wherein the attachment ends define openings configured to receive the self-engaging strap.

4. The simulated bicycle brake hood attachment of claim 1 wherein a width of the head portion is larger than a width of the post portion to form curved regions on sides of the post portion.

5. The simulated bicycle brake hood attachment of claim 4 wherein the post portion has a width across the handlebar in a range of 23-33 mm and the head portion has a width across the handlebar in a range of 25-35 mm.

6. The simulated bicycle brake hood attachment of claim 1 wherein the post portion forms an obtuse angle relative to a top section of the base portion.

7. The simulated bicycle brake hood attachment of claim 6 wherein the post portion forms an obtuse angle in a range of 110-130 degrees.

8. The simulated bicycle brake hood attachment of claim 1 wherein the rounded surface of the post portion curves upward from the top section of the base portion.

9. The simulated bicycle brake hood attachment of claim 1 wherein the post portion has a width across the handlebar in a range of 23-33 mm.

10. The simulated bicycle brake hood attachment of claim 1 wherein the base portion and the post portion have a length along the handlebar in a range of 60-80 mm.

11. The simulated bicycle brake hood attachment of claim 1 wherein the post portion has a height in a range of 18-26 mm.

12. The simulated bicycle brake hood attachment of claim 1 wherein the base portion, the post portion and the head portion are molded as one piece from a thermoplastic material.

13. A stationary bicycle comprising:
   at least first and second handlebars; and
   first and second simulated bicycle brake hood attachments attached to the first and second handlebars, respectively, wherein each of the simulated bicycle brake hood attachments comprise:
      a base portion defining a partially cylindrical mounting region configured to receive a portion of a handlebar of a stationary bicycle, wherein the base portion includes attachment ends on each side of the base portion;
      a post portion extending at a first end from the base portion, the post portion including a rounded surface configured to receive a web of a hand between a thumb and forefinger; and a head portion at a second end of the post portion, the head portion including a rounded top surface.

14. The stationary bicycle of claim 13 wherein each of the simulated bicycle brake hood attachments further comprise an attachment mechanism coupled to the attachment ends and configured to be secured around the handlebar.

15. The stationary bicycle of claim 14 wherein the attachment mechanism includes a self-engaging strap.

16. The stationary bicycle of claim 15 wherein the self-engaging strap includes a hook and loop fastener.

17. The stationary bicycle of claim 13 wherein a width of the head portion is larger than a width of the post portion to form curved regions on sides of the post portion.

18. The stationary bicycle of claim 13 wherein the post portion forms an obtuse angle relative to a top section of the base portion.

* * * * *